Figure 1:
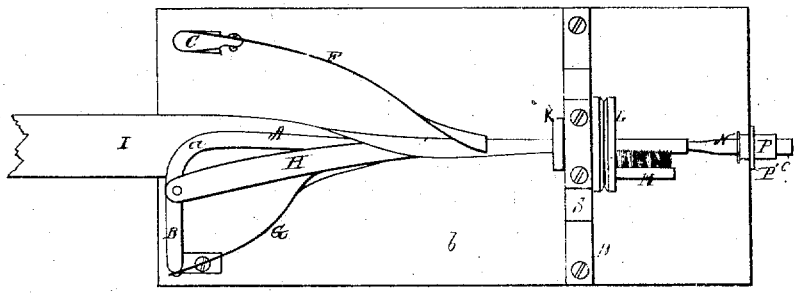

A. G. BATCHELDER.

Assignor by mesne Assigments, to J. H. HAWORTH and W. S. WATSON.

Machine and Process for Making Paper Tubes.

No. 8,196. Reissued April 23, 1878.

Witnesses.

C. G. Chick.

J. P. Tucker

Inventor.

Israel G. Batchelder by atty, A. S. Fenner.

UNITED STATES PATENT OFFICE.

ASAHEL G. BATCHELDER, OF LOWELL, MASSACHUSETTS, ASSIGNOR, BY MESNE ASSIGNMENTS, TO JOHN H. HAWORTH AND WALTER S. WATSON, OF SAME PLACE.

IMPROVEMENT IN MACHINES AND PROCESSES FOR MAKING PAPER TUBES.

Specification forming part of Letters Patent No. 158,354, dated January 5, 1875; Reissue No. 8,196, dated April 23, 1878; application filed October 26, 1877.

*To all whom it may concern:*

Be it known that I, ASAHEL G. BATCHELDER, of Lowell, Middlesex county, Massachusetts, have invented certain Improvements in Machines and Processes for Making Paper Tubes; and that the same are fully described in the annexed specification and illustrated in the accompanying drawing.

In some respects my machine is analogous to that described in United States Patent No. 95,670, granted October 12, 1869, to H. and J. Douglass, each of the machines being to convert a strip of paper into a tube, to be subsequently reduced to short pieces, termed "cop-tubes." I disclaim the mechanism and the process described in said patent.

The common form of cop-tube machine embodies a cylindrical hollow mandrel, a series of grooved rollers for shaping and carrying forward the tube, and a suitable pasting apparatus, by means of which a strip of paper is formed into a continuous tube to be cut into the desired lengths for use.

In practicing my invention I employ paper suitably pasted, and the mandrel furnished with a bore-finisher, as herein afterward described; but, instead of the grooved shaping-rollers heretofore used to form and carry forward the paper tube, I rely on some other suitable means to draw the tube off the mandrel and away from the machine, and I wrap the paper strip around the mandrel by a series of springs or fingers, shaped at their bearing ends to conform to the cylindrical mandrel, but exerting more or less friction upon the outer surface of the paper, so as to lay it smooth and avoid wrinkles. These friction-benders are a peculiar feature of my invention. I adapt one of them especially to extend beneath the lap, and lay the inner edge of the paper smoothly upon the mandrel, in readiness to receive the outer fold to be overlapped and pressed upon it.

Another peculiarity of my invention, designed particularly for finishing the laps, is a rotary tube or edge-layer, which presses down and smooths between itself and the mandrel the outer fold of the paper upon the inner one. In connection with this device I use a finishing-brush, revolving about the mandrel, as will be described.

My invention also embraces, as the final finishing mechanism for both the inner and outer surfaces of the tube, an enlargement of the mandrel, termed by me as an "expander or bore-finisher," which stretches and smooths the inside of the tube, and gives it a uniform caliber, and, in combination therewith, a finishing-tube surrounding the expanded part of the mandrel and acting upon the outside of the tube at the same time the bore-finisher is operating upon its inner surface.

My invention also consists in the process herein described of producing paper cop-tubes.

Figure 2:
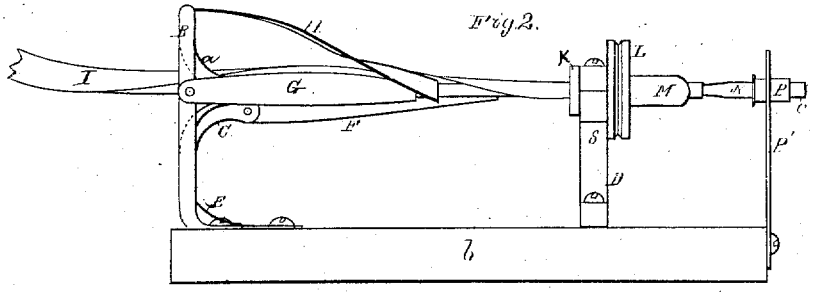
Figure 3:
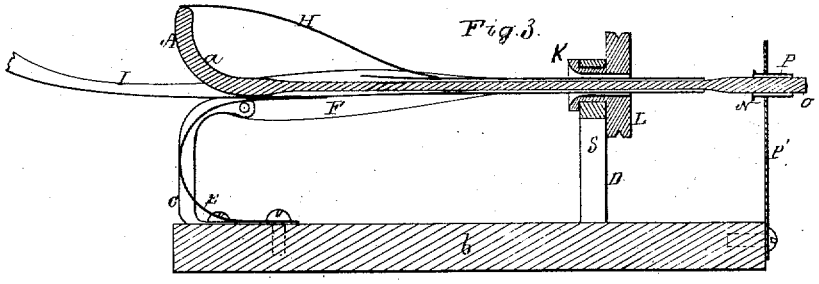

In the annexed drawing, Figure 1 is a top view, Fig. 2 a side elevation, and Fig. 3 a longitudinal section, of a machine embodying my improvements.

A is the horizontal mandrel, upon and around which the tube is formed. B is a suitable supporting-standard for the mandrel, holding it in convenient position to receive the paper strip C. A series of spring-fingers, E F G H, secured at one end to the machine, and curved at or near the other end to conform in shape to the cylindrical mandrel, act upon the pasted paper strip to wrap it around and shape it to the mandrel, and press the overlapping edge upon the inner fold, so as to form a continuous tube, C′. The bender H extends beneath the overlapping edge of the paper, and lays the inner edge down smoothly upon the core A, while the other fingers bear successively, and from different directions, upon the outside of the paper, and press with some degree of friction upon the same, so as to unite the folds and prevent creases or wrinkles therein as the tube is drawn through the machine between the mandrel and the spring-fingers. The degree of pressure varies according to the position and stiffness of the springs.

In front of these friction-benders I use a rotary edge-layer, K, which is a short tube concentric with and encompassing the mandrel and paper tube. It is supported in a bearing in a standard, D, and is provided with a pulley, L, and a driving-belt or other suitable means of rotation. A brush, M, is secured to the pulley, so as to revolve with it and the tube K around the mandrel. These devices press down the edges, close the lap, and remove the surplus paste from the exterior of the tube, giving it a preliminary finish for the purpose of more completely laying the edges or laps.

The final action of the machine upon the tube remains to be described. Near its outer end the mandrel is gradually enlarged, as shown at N, and from thence it is cylindrical, as at O, having there a diameter considerably greater than along the part upon which the tube is first formed. The parts N O, I term the "expander or bore-finisher," their purpose being to take up all the slack in the paper, to enlarge the tube, and to make it of uniform bore throughout.

To guard against undue expansion or rupture of the tube, as well as to give it a final outward finish, I surround the enlarged part of the mandrel with a tube or finisher, P, mounted upon a suitable standard, and held in such position that the tube is compressed and finished as a whole between the parts O and P at the same time, and after its expansion by the part N. Thus, the tube constructed by this process and mechanism is subjected to pressure at three different points, at each of which it receives a certain degree of finish, and is exposed to outward detaining frictional contact with the forming and finishing devices.

I claim as of my invention—

1. The combination, in a machine for making paper cop-tubes, of a mandrel circular in cross-section, with a series of stationary friction-benders, shaped at their bearing ends to conform to the cylindrical mandrel, and adapted to wrap the pasted strip about the mandrel without wrinkles, substantially as set forth.

2. The combination, with a suitable mandrel, of a series of elastic fingers, shaped near their bearing ends to conform, generally, to the mandrel, and adapted to operate successively and from different directions upon the paper strip, substantially as set forth.

3. In a machine for making paper cop-tubes, a cylindrical mandrel, in combination with stationary friction-benders conforming thereto, one of said benders being curved, and adapted to extend between the folds of the pasted strip of paper to the inner edge of the same, so as to lay the inner folds thereof smoothly and firmly upon the mandrel, substantially as set forth.

4. The combination of two tubular outside finishers with tube-forming mechanism, substantially as described.

5. The combination, with a mandrel and a series of strip-benders, of a lap-finishing brush adapted to revolve about the mandrel, substantially as set forth.

6. A mandrel for paper-tube machines, having a suitable body, upon which the tubes are formed, and an expander or bore-finisher, N O, in combination with a tube-finisher, P, surrounding the bore-finisher, substantially as set forth.

7. The combination, with stationary friction mechanism for forming paper tubes, of apparatus, substantially as described, for simultaneously finishing the inner and outer surfaces of the tubes.

8. In a machine for making paper cop-tubes, an elastic bender, shaped to conform at its bearing end to the cylindrical mandrel, and secured to the base or frame, so as to press with friction upon the pasted paper strip and unite the folds thereof, substantially as set forth.

9. The process of producing cop-tubes, which consists in folding a suitably-pasted strip of paper between the parts of a stationary friction apparatus, drawing it over a boss raised on the mandrel, and at the same time finishing the outside surface of the tube, all substantially as described, the tube thus formed being afterward divided, as stated.

ASAHEL G. BATCHELDER.

Witnesses:
W. R. BATCHELDER,
A. H. SPENCER.